J. J. TOBIN.
TOOL.
APPLICATION FILED FEB. 20, 1913.
1,094,687.
Patented Apr. 28, 1914.
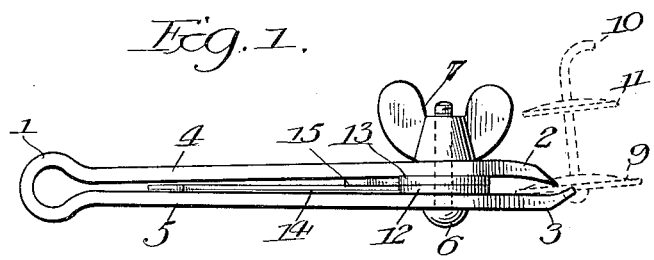
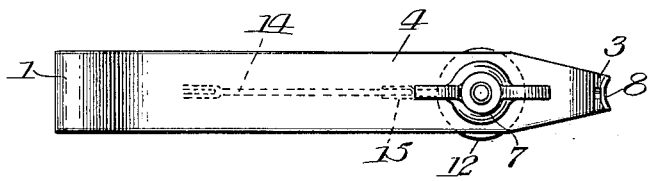
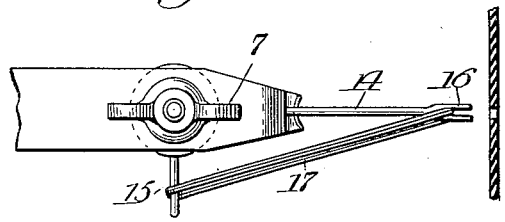
Witnesses
Inventor
John J. Tobin

UNITED STATES PATENT OFFICE.

JOHN J. TOBIN, OF CHICAGO, ILLINOIS, ASSIGNOR TO SPECIALTY SALES AND MANUFACTURING COMPANY, OF CHICAGO, ILLINOIS, A CORPORATION OF ILLINOIS.

TOOL.

1,094,687.  Specification of Letters Patent.  Patented Apr. 28, 1914.

Application filed February 20, 1913.  Serial No. 749,676.

*To all whom it may concern:*

Be it known that I, JOHN J. TOBIN, a citizen of the United States, residing at Chicago, in the county of Cook and State of Illinois, have invented a certain new and useful Improvement in Tools, of which the following is a full, clear, concise, and exact description, reference being had to the accompanying drawings, forming a part of this specification.

My invention relates to tools and has for its object the provision of an improved kind of tool adapted more particularly for use in connection with repairs on single tube bicycle tires.

There are two prominent ways of repairing single tube bicycle tires. One is by the insertion of a metallic plug, having clamping members to hold the same in place upon the tire, and the other system of repair contemplates the use of rubber bands which in a stretched condition are inserted into the hole and are then permitted to expand and fill the entire opening.

My invention contemplates the provision of a tool which may serve for both classes of repairs, thus uniting in one instrument the function of two.

I will explain my invention more in detail by referring to the accompanying drawing illustrating the same in which:

Figure 1 is a side elevation of my improved tool; Fig. 2 is a top plan view thereof, and Fig. 3 is a plan view showing details of construction.

The improved tool of my invention consists of the spring clamp 1 terminating in two jaws 2 and 3. The two jaws 2 and 3 are the extremities of the corresponding arms 4 and 5 and may be clamped together through the agency of the bolt 6 and nut 7. I preferably provide a circular recess at 8 to accommodate the ordinary metallic bicycle tube plug, which plug as well understood consists preferably of a metallic face plate with its swiveled screw threaded extension carrying a nut between which nut and face plate the tire is clamped. My tool serves more particularly in holding this repair plug during the time that the tire is forced over the head. The head is held between the jaws 2 and 3, the circular recess 8 accommodating the screw threaded plug. The tool acts in the nature of a vise so that the tire can be readily forced over the plug head. My improved tool, however, is also capable of repairing a tire through the use of rubber bands and to this end two washers 12 and 13 are pivotally mounted upon the bolt 6. The washers 12 and 13 have extending pins 14 and 15 respectively, the pin 14 being provided with a notch 16 at its extremity. These pins 14 and 15 are normally in place extending backwardly between the arms 4 and 5 as shown so that the tool is collapsible and may be carried in the pocket. Should the device be required however to repair the tube the two washers 12 and 13 are clamped between the jaws, while remaining upon the bolt 6 in such a way that they extend at right angles as shown. Rubber bands 17 are then stretched between them tightly, being inserted in the recesses 16, 16. The pin 14 is then inserted into the hole of the tube and the pressure upon the nut 7 released permitting the rubber bands 17 by virtue of their resiliency to swing the arm 15 into line with the arm 14, thereby shortening these rubber bands and permitting them to expand within the aperture of the tube. Thereupon the pin 14 is withdrawn and the rubber bands entirely fill the break in the tube. After use the pins 14 and 15 are then again swung backwardly between the arms 4 and 5. From this it will be seen that the same tool serves two purposes and that it can be called upon to repair holes in tires by either of the two prominent ways utilized.

It will of course be understood that my invention is capable of many modifications without departing from its spirit, but

Having thus described one form of carrying out my invention, what I claim as new and desire to secure by Letters Patent is:

1. In a device of the character described, the combination with a pair of jaws, a bolt for clamping said jaws, and a pair of arms pivotally mounted upon said bolt and adapted to be clamped by said bolt.

2. In a device of the character described, the combination with a pair of jaws, a bolt for clamping said jaws, a pair of arms pivotally mounted upon said bolt and adapted to be clamped by said bolt, and a recess provided in the extremity of one of said arms for the purpose of holding rubber bands, said arms having means whereby they are pivotally mounted upon said bolt, said jaws accommodating said arms between them when not in use.

In witness whereof, I hereunto subscribe my name this 31st day of January, A. D. 1913.

JOHN J. TOBIN.

Witnesses:
HAZEL ANN JONES,
O. M. WERMICH.

Copies of this patent may be obtained for five cents each, by addressing the "Commissioner of Patents, Washington, D. C."